(12) United States Patent
Kan

(10) Patent No.: US 8,741,107 B2
(45) Date of Patent: Jun. 3, 2014

(54) TAILINGS SOLVENT RECOVERY UNIT

(75) Inventor: Jianmin Kan, Calgary (CA)

(73) Assignee: Total E & P Canada Ltd., Calgary (CA)

( * ) Notice: Subject to any disclaimer, the term of this patent is extended or adjusted under 35 U.S.C. 154(b) by 116 days.

(21) Appl. No.: 13/283,808

(22) Filed: Oct. 28, 2011

(65) Prior Publication Data

US 2012/0043178 A1   Feb. 23, 2012

Related U.S. Application Data

(62) Division of application No. 12/436,958, filed on May 7, 2009, now Pat. No. 8,197,676.

(51) Int. Cl.
*B01D 11/02* (2006.01)

(52) U.S. Cl.
USPC ........................................................ 196/14.52

(58) Field of Classification Search
USPC ........................................................ 196/14.52
See application file for complete search history.

(56) References Cited

U.S. PATENT DOCUMENTS

| | | | |
|---|---|---|---|
| 4,315,815 | A | 2/1982 | Gearhart |
| 6,712,215 | B2 | 3/2004 | Scheybeler |

FOREIGN PATENT DOCUMENTS

| | | |
|---|---|---|
| CA | 1013695 | 7/1977 |
| CA | 2272035 | 11/2000 |
| CA | 2272045 | 11/2000 |
| CA | 2353109 | 1/2003 |
| CA | 2454942 | 7/2005 |
| CA | 2587166 | 9/2007 |
| CA | 2587166 A1 * | 9/2007 |
| CA | 2613873 | 9/2007 |
| CA | 2614669 | 9/2007 |

* cited by examiner

*Primary Examiner* — Randy Boyer
(74) *Attorney, Agent, or Firm* — Sean W Goodwin; Linda M Thompson

(57) ABSTRACT

A tailings solvent recovery vessel substantially without conventional internals utilizes nozzles for forming very fine solvent-containing hydrocarbon droplets from a solvent-containing tailings feedstream. The hydrocarbon droplets are discrete from water droplets. The hydrocarbon droplets are small enough to result in a large surface area and a desired fall residence time but sufficiently large that they are not entrained with the rising vapor in the vessel. The feedstream is introduced to the vessel with a pressure drop to result in an initial flashing of the solvent from the solvent-containing droplets. Heat from the vessel atmosphere or from steam flowing countercurrent to the falling hydrocarbon droplets is transferred to the falling hydrocarbon droplets resulting in vaporization of any residual solvent therefrom. A substantially solvent-depleted pool is collected in the bottom of the vessel and retained only so long as is required to pump the underflow stream from the vessel.

20 Claims, 7 Drawing Sheets

TAILINGS SOLVENT RECOVERY UNIT

CROSS-REFERENCE TO RELATED APPLICATIONS

This application is a divisional application claiming the benefit of U.S. application Ser. No. 12/436,958, filed May 7, 2009, and issued as U.S. Pat. No. 8,197,676 filed on Jun. 12, 2012, the entirety of which is incorporated herein by reference.

FIELD OF THE INVENTION

Embodiments of the invention relate to the recovery of hydrocarbon diluent from tailings resulting from the treatment of bitumen froth formed during bitumen recovery from oil sands and, more particularly, relate to apparatus for the recovery of the hydrocarbon diluent from said hydrocarbon diluent-containing tailings.

BACKGROUND OF THE INVENTION

Bitumen is produced from oil sand such as is found in the Fort McMurray region of Alberta, Canada. The oil sand is mined and has been commercially recovered using hot water processes which generally require slurrying the oil sand with at least heated water or steam. The slurry is conditioned and the resulting froth separated from the solids portion for recovery of the bitumen therefrom.

The bitumen containing froth is typically diluted with a hydrocarbon diluent, such as a naphthenic or paraffinic solvent, to reduce the viscosity and to aid in separating the bitumen from water and solids contained in the froth. Separation of the bitumen from the solids and water typically results in a bitumen-rich stream and a solvent-containing tailings feedstream.

In order to improve the economics of the bitumen recovery processes and the environmental impact of tailings disposal, solvent recovery apparatus and processes, generally known as tailings solvent recovery units (TSRU) are employed to recover the solvent from the solvent-containing tailings stream prior to disposal. The recovered solvent is typically recycled for use in the froth treatment processes. Conventional solvent recovery is typically effected by increasing the surface area of the solvent-containing tailings feedstream by creating a thin film of feed using internals such as shed decks or by retaining a pool of solvent containing tailings within the vessel for sufficient time, typically at least 5 to 15 minutes, to permit solvent release from the pool.

U.S. Pat. No. 6,712,215 to Scheybeler describes a solvent recovery vessel having pairs of nozzles located within the vessel. Each pair of nozzles is arranged horizontally in a 180-degree, opposed relationship. The nozzles have a first inlet for receiving solvent-containing tailings and a second inlet for receiving steam. A single outlet discharges a mixed steam/tailings stream. Adiabatic expansion of the steam, when contacted with the tailings, carries the discharge stream at high speed toward a centre of the vessel. The opposing orientation of the nozzles causes the discharge streams to collide at high speed forming small droplets in the vessel. The large surface area of the droplets facilitates release of the solvent from the liquid phase to the vapour phase. Shed decks located below the collision zone are heated using a steam sparger located beneath the shed decks and act to spread the droplets into thin layers thereon to facilitate heat transfer resulting in further solvent release. Another steam sparger is located in a lower portion of the column and further aids in stripping residual solvent from the liquid within the vessel. Pressure in the vessel is maintained at sub-atmospheric conditions through use of a steam eductor.

Canadian Patent 2,272,035 to Mocal Energy Limited et al (Syncrude) utilizes a vacuum flash TSRU vessel at sub-atmospheric pressure, preferably 30-35 kPa, to vapourize hydrocarbon diluents, including both naphthenic and paraffinic solvents, from the tailings stream. Steam is introduced into a pool of liquids which accumulate in the bottom of the vessel to vapourize residual diluent and water. The vapours are removed from the vessel and are condensed to recover the diluents for recycling.

Canadian Patent 2,272,045 to Mocal Energy Limited et al (Syncrude) teaches introduction of froth treatment tailings into a near atmospheric steam stripping TSRU vessel having a plurality of interior, vertically-spaced shed decks. The liquid tailings stream is evenly distributed over shed decks creating a thin film of the liquid feed on an upper surface of the shed decks. Steam is introduced below the shed decks and flows countercurrent to the tailings stream in order to vapourize the hydrocarbon diluents from the thin film of feed material. The vessel is preferably maintained at near atmospheric conditions (about 95 kPa).

Canadian Patent 2,353,109 to Shell Canada Limited et al teaches recovery of a paraffinic solvent, typically $C_5/C_6$, through introduction of solvent-containing froth treatment tailings to a TSRU vessel that is free of internals. The feedstream is heated by indirect heating or direct steam injection to about 75-90° C. prior to introduction to the vessel through an inlet device. The inlet device induces a pressure drop to atomize and disperse the liquid components of the stream and thereby minimize foaming. An impingement surface and co-injection of an inert gas to minimize foaming is also contemplated. The TSRU vessel is operated at slightly above atmospheric pressure, preferably 150 kPa-200 kPa. A pool of liquid and solids is maintained in a lower portion of the vessel to provide sufficient residence time to permit solvent to vapourize therefrom. The pool is agitated to ensure the solids, particularly the solvent-laden, less dense asphaltenes, and the liquids, are well mixed therein and to provide shear for reducing the particle size therein. The solvent is recovered as an overhead vapour stream. A bottoms stream may be recirculated into the same vessel or pumped to a second, identical vessel. The second vessel is typically operated at a lower absolute pressure (50-70 kPa) and at a temperature of about 50-70° C.

Canadian Patent Application 2,454,942 to Fort Hills Energy Corporation teaches introduction of solvent containing forth treatment tailings to a TSRU vessel that is free of internals and comprises a "pump-around" circuit to avoid formation of an asphaltene "mat" on top of the liquid and solids pool, to suppress foam formation and to increase solvent recovery. A pool of liquid and solids is maintained in the lower part of the vessel and a high downward liquid flowrate through the vessel is maintained by recycling a portion of the tailings, using the pump-around circuit, from the bottom of the vessel and back into the vessel. Shear from the recycle pump is useful to break up asphaltene flocs and liberate solvent from the tailings. The solvent is recovered as an overhead vapour stream. The TSRU vessel is operated at sub-atmospheric pressure. A two-stage process is also contemplated.

Canadian Patents 2,587,166, 2,613,873 and 2,614,669 to Imperial Oil Resources Limited teach steam stripping TSRU vessels having internals (shed decks) with feed streams that contain asphaltenes. Both one stage and two stage processes are claimed. Steam is introduced below the internals or directly into a pool of liquids in the vessel and, in all cases, no agitation is utilized to mix the contents of the pool. At least a first TSRU vessel is operated at an absolute pressure between 100 kPa-200 kPa and at a temperature of between 75° C. and 100° C. A second TSRU is contemplated and is operated at a pressure lower than the first TSRU, being about 20-200 kPa and preferably 25-100 kPa and at a temperature of between 75° C. and 100° C. Additional TSRU vessels are contemplated to be added in series.

There remains significant interest in the industry for apparatus and processes which result in even more efficient and effective solvent recovery, particularly for feed streams which contain paraffinic solvents and asphaltenes resulting therefrom and to meet ever more stringent regulations regarding minimizing solvent loss and tailings disposal generally.

SUMMARY OF THE INVENTION

Embodiments of the invention result in a rapid, highly efficient recovery of solvent from a solvent-containing tailings feedstream as a consequence of a very high liquid/gas interfacial area resulting from the formation of relatively small, solvent-containing hydrocarbon droplets from the feedstream, which are discrete from water droplets, in a solvent recovery vessel. The droplets are formed by a plurality of nozzles and are sufficiently small to result in a fall residence time from the nozzles to the bottom of the vessel of less than about 10 seconds and are sufficiently large to prevent entrainment with rising vapour in the vessel.

In one broad aspect of the invention, a solvent recovery vessel for recovery of solvent from a tailings feedstream containing at least bitumen, solvent and water comprises: a vessel having a height, an upper outlet for removing at least a vapour stream of solvent therethrough, a lower outlet at a bottom of the vessel for removing a substantially solvent-depleted underflow stream therethrough, the vessel being substantially free of internals and having a heated atmosphere; and a plurality of nozzles positioned in an upper section of the vessel for directing the tailings feedstream generally axially therein with sufficient shear for forming at least hydrocarbon droplets containing at least bitumen and solvent, discrete from water droplets, at least a portion of the hydrocarbon droplets falling through the height of the vessel in a fall residence time less than about 10 seconds, wherein a pressure drop between the solvent-containing tailings feedstream and the vessel of about 550 kPa to about 825 kPa is maintained for vapourizing at least a portion of the solvent from a surface of the hydrocarbon droplets; thereafter further vapourizing solvent for substantially depleting the hydrocarbon droplets of solvent as the hydrocarbon droplets fall through the heated atmosphere of the vessel before reaching the bottom, reducing a diameter of the solvent-depleted hydrocarbon droplets to within a range from about 0.2 mm to about 0.1 mm for forming the substantially solvent-depleted underflow stream.

In another broad aspect of the invention, A method for removing solvent from a tailings feedstream containing at least bitumen, solvent and water, comprises: feeding the solvent-containing tailings feedstream to a solvent recovery vessel being substantially free of internals and having a heated atmosphere therein; discharging the solvent-containing tailings feedstream through a plurality of nozzles into the vessel for forming at least hydrocarbon droplets containing at least bitumen and solvent therefrom which are discrete from water droplets; subjecting the hydrocarbon droplets exiting the plurality of nozzles therein to a pressure drop and to the heated atmosphere for vapouring substantially all of the solvent from the hydrocarbon droplets and reducing a diameter thereof sufficiently so as to fall to a bottom of the vessel in less than about 10 seconds; withdrawing solvent vapour from a top of the vessel; and discharging a substantially solvent-depleted underflow stream from the bottom of the vessel.

The substantially solvent depleted droplets are retained in the bottom of the vessel only for a sufficient pool residence time so as to allow pumping of the pooled droplets as the underflow stream therefrom. In embodiments of the invention the total residence time, including the fall residence time and the pool residence time, is less than about 2 minutes.

Further, an inert fluid such as nitrogen, carbon dioxide or steam is flowed countercurrent to the falling droplets for retarding the fall retention time of the hydrocarbon droplets to permit greater solvent vaporization therefrom.

In the case of steam, heat from the rising steam is transferred to the discrete hydrocarbon droplets further enhancing the solvent vaporization therefrom.

DETAILED DESCRIPTION OF THE PREFERRED EMBODIMENT

Figure 1A:
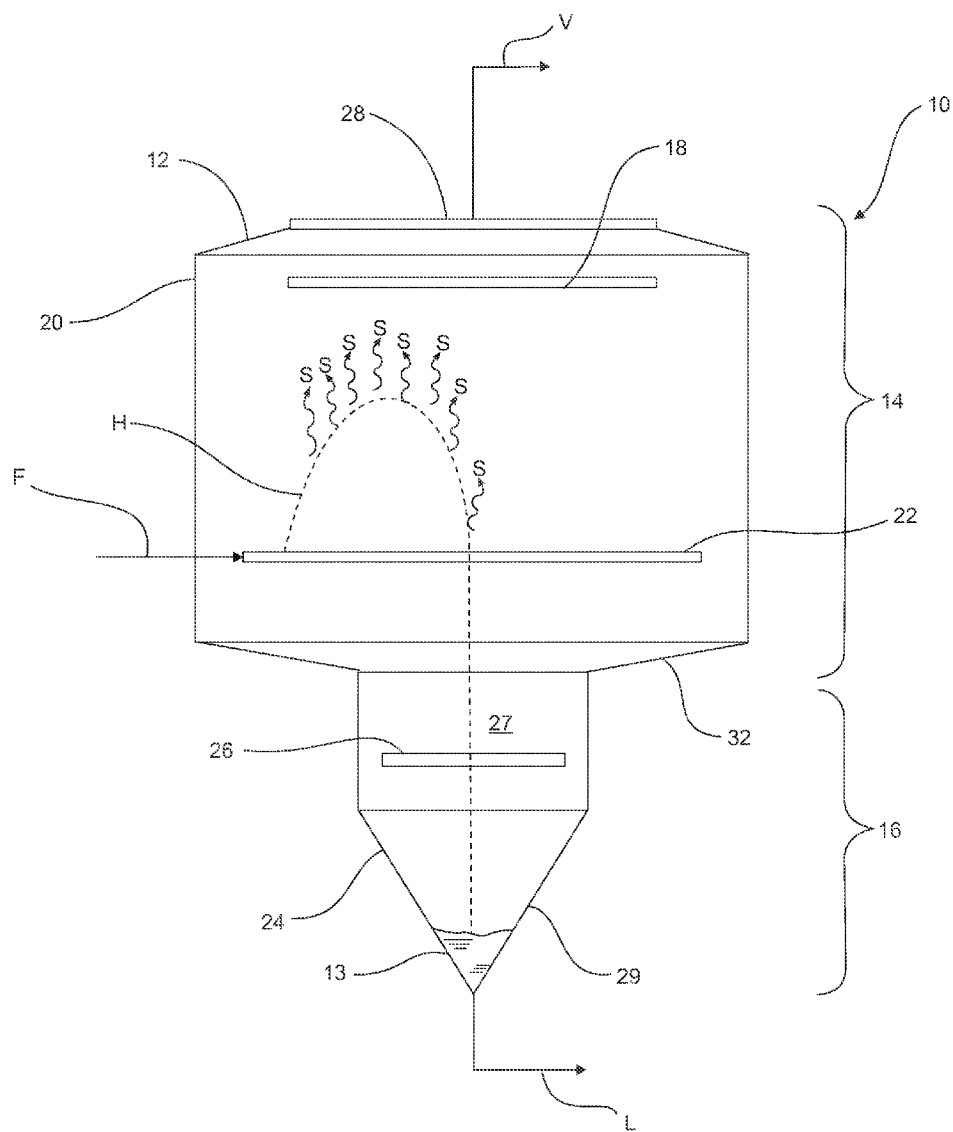
FIG. 1A is cross-sectional schematic view of a tailings solvent recovery unit (TSRU) according to an embodiment of the invention, a plurality of feed nozzles being directed upwardly therein and one exemplary flow path of hydrocarbon droplets shown schematically thereon.

Embodiments of the invention disclose apparatus and a method for recovering solvent from a solvent-containing tailings feedstream F produced as an underflow stream from a froth treatment facility. Hydrocarbon droplets H are formed from the solvent-containing tailings feedstream F for providing a large surface area from which the solvent is recovered.

Applicant believes that solvent recovery performance is a function of a combination of one or more of:

a. formation of discrete solvent-containing hydrocarbon droplets H formed from the introduction of solvent-containing tailings feedstream F at high temperature to a lower pressure gas phase environment to effect initial flashing of solvent S from the hydrocarbon droplets H;

b. formation of hydrocarbon droplets H which are discrete from water droplets W;

c. surface area of the hydrocarbon droplets H;

d. heat supply to the hydrocarbon droplets H within the vessel so as to cause vapourization of residual solvent therefrom; and e. the duration of exposure of the hydrocarbon droplets H to the elevated temperature so as to recover substantially all of the residual solvent therefrom.

An exemplary feedstream F comprises about 61% water, 7% solvent, 12% bitumen and 20% solids.

Having reference to FIGS. 1A-7 and 8A, a tailings solvent recovery unit (TSRU) 10 is shown, according to an embodiment of the invention. The TSRU comprises a vessel 12 having at least an upper section 14. The upper section 14 houses a plurality of feed nozzles 22. A lower section 16 of the vessel 12 can act as an underflow section or pump box 24 for collecting a substantially solvent-depleted pool of liquids and solids or underflow stream L therein. The upper section 14 can also house a demister pad 18 at a top 20 of the vessel 12.

In embodiments of the invention, the solvent-containing tailings feedstream F is introduced to the vessel 12 and is fed to the plurality of nozzles 22. The feedstream F is discharged through the plurality of nozzles 22 into the vessel 12 under a pressure drop. The nozzles 22 are designed to disperse the feedstream F within the vessel 12 and impart sufficient shear to result in at least a portion of the solvent-containing tailings feedstream F being separated into relatively small hydrocarbon droplets H discrete from water droplets W. The hydrocarbon droplets H contain bitumen, solvent S and may also contain other solids.

At least a portion of the solvent S is initially vapourized in the TSRU 10 as a result of flashing of solvent S from the relatively small hydrocarbon droplets H within the vessel 12. The flashing results in a cooling of the hydrocarbon droplets H. The hydrocarbon droplets H are reduced in diameter as a result of the initial release of solvent S as vapour V therefrom. The smaller diameter, solvent-depleted hydrocarbon droplets H fall more slowly through the environment of the vessel 12 than would droplets of larger diameter. At least a portion of the hydrocarbon droplets H fall substantially unimpeded through the vessel 12, the vessel 12 being substantially absent any conventional internals. Thus, recombining of the hydrocarbon droplets H with the water droplets W is largely avoided until the droplets H,W approach a bottom 13 of the vessel 12.

A minimum amount of water is also flashed from the water droplets W so as to minimize carryover of water vapour with the solvent vapour V.

A fall residence time of the relatively small diameter hydrocarbon droplets H through the vessel 12 may be further retarded by an inert fluid flowing countercurrent to the falling hydrocarbon droplets H. Suitable inert fluids can include nitrogen, carbon dioxide or steam.

In order to facilitate or enhance vapourization of substantially all residual solvent S from the hydrocarbon droplets H, the hydrocarbon droplets H are reheated in a heated atmosphere of the vessel 12 as they fall therethrough. Reheating may occur simply as a result of residual heat in the vessel 12 resulting from heat supplied to the vessel 12 or vessel atmosphere by the heated feedstream F or from heat introduced by other means, such as heating the flow of inert fluid or directly applying heat to the walls of the vessel 12.

In embodiments of the invention, reheating of the hydrocarbon droplets H is accomplished through the introduction of steam. The steam imparts heat to the hydrocarbon droplets H. Steam may be introduced at or below a steam distributor 26 housed in the lower section 16 of the vessel 12. Optionally, steam may also be co-injected at the nozzles 22 for aiding in reheating the hydrocarbon droplets H immediately after flashing. The upwardly flowing steam further acts to slow the fall residence time of the smaller diameter hydrocarbon droplets H therethrough.

The recovered vapour V passes upward through the demister pad 18 and is collected as a vapour stream at an outlet 28 at the top 20 of the vessel 12. The recovered vapour V comprises at least a vapour stream of the solvent S which is discharged from the outlet 28. The recovered vapour V is subsequently cooled to condense the recovered vapour and liquid solvent S is recovered therefrom as is known in the art. The recovered liquid solvent is thereafter recycled for use, typically within the froth treatment process.

The substantially solvent-depleted hydrocarbon droplets H thereafter coalesce or are overtaken by water droplets W falling within the vessel 12 and combine to form larger solvent-depleted underflow droplets which are urged to the vessel's bottom 13 and are accumulated therein as the substantially solvent-depleted underflow stream L. Hydrocarbon droplets H may also receive heat from the overtaking water droplets W which further enhances solvent vaporization therefrom as the substantially solvent-depleted hydrocarbon droplets H combine with the water droplets W to form the underflow stream L.

According to embodiments of the invention, a typical fall residence time for the hydrocarbon droplets falling through the vessel 12, from introduction at the nozzles 22 to arrive at the bottom 13 of the vessel 12, is less than about 10 seconds. This aids in achieving a total residence time in the vessel 12 which Applicant believes is at least 2 to 10 times faster than conventional TSRU vessels which comprise internals or where steam is delivered to a deep pool in a bottom of a prior art vessel.

In embodiments of the invention, the hydrocarbon droplets H are substantially solvent-depleted in less than about 2 seconds. The solvent-depleted tailings underflow stream L is collected in a conical section 29 at the bottom of the vessel 12 and is generally pumped therefrom to a tailings pond for disposal. A pool residence time of the substantially solvent-depleted tailings underflow stream L is typically about 90 seconds to permit liquid level control and activation of the pumps for pumping the underflow stream L therefrom. Thus, in embodiments of the invention, the fall residence time and the pool residence time together result in the total residence time of the tailings feedstream F within the vessel 12 of less than about 2 minutes.

The plurality of nozzles 22, positioned within the upper section 14, act to discharge the tailings feedstream F as the relatively small diameter hydrocarbon droplets H and water droplets W. The smaller diameter hydrocarbon droplets H act to create a large overall surface area, maximizing the rate of transfer of solvent S therefrom to the gas phase. The relatively small droplet diameter results in a high liquid/gas interfacial area which increases the overall rate of vapourization. The surface area created as a result of the production of the hydrocarbon droplets H is typically at least an order of magnitude greater than the increase in surface area created in conventional, prior art systems which utilize shed decks and similar internals to form thin films thereon. Thus, the extent of recovery of solvent S is also maximized.

The hydrocarbon and water droplets H,W are typically large enough to minimize entrainment with vapour and the countercurrent fluid flow rising within the vessel 12. Thus, contamination of the recovered vapour stream V with solids and water contained in the feedstream F is minimized. The hydrocarbon and water droplets H,W formed however are sufficiently small so that the total surface area of the feedstream F is significantly increased for release of solvent S therefrom. The diameter of the hydrocarbons droplets H is sufficiently small that the fall residence time of the hydrocarbon droplets H is sufficiently long so as to ensure residual solvent S is vapourized therefrom. The vessel 12 has a height to provide a falling path which, in combination with the diameter of the hydrocarbon droplets H and the countercurrent fluid flow, is sufficiently long so as to cause the hydrocarbon droplets H to be substantially solvent-depleted as they reach the bottom 13 of the vessel 12.

In embodiments of the invention, the diameter of the hydrocarbon droplets H, following vapourization of substantially all of the solvent S therefrom, is in a range from about 0.1 mm to about 0.2 mm or about 0.1 mm to about 0.15 mm.

In an embodiment of the invention, the hydrocarbon droplets H initially delivered from the plurality of nozzles 22 are about 0.5 mm in diameter.

Figure 1B:
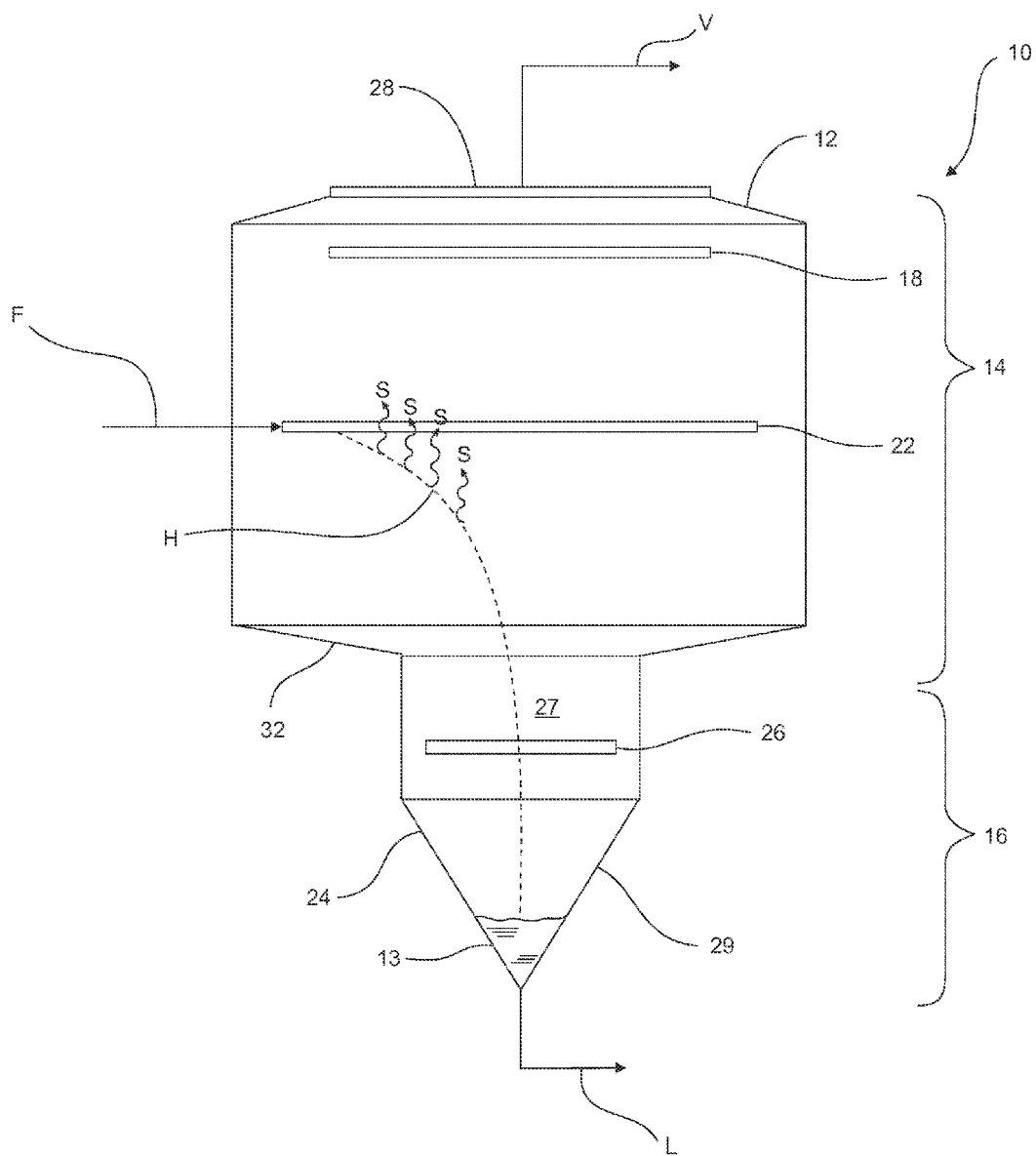
FIG. 1B is cross-sectional schematic view of a tailings solvent recovery unit (TSRU) according to an embodiment of the invention, a plurality of feed nozzles being directed downwardly therein and one exemplary flow path of hydrocarbon droplets shown schematically thereon.

As shown in FIGS. 1A and 1B, typically, the nozzles 22 are positioned in a nozzle spray zone 30 in the upper section 14 of the vessel 12, which has sufficient height to permit a plurality of primary nozzles 22 and a plurality of backup nozzles 22 therein.

In an embodiment of the invention as shown in FIG. 1A, the plurality of nozzles 22 are oriented upwardly for creating droplets H,W of the design size and having a trajectory such that impingement on the walls of the vessel 12, while inevitable, is minimized. The droplets H,W are initially directed upward within the upper section 14 of the vessel 12 after which the droplets H,W fall downwardly through the height of the vessel 12. As a result, the height of the upper section can be minimized.

Optionally, and in other embodiments of the invention, as shown in FIG. 1B, the nozzles 22 may also be directed downwardly into the vessel 12, the trajectory of the droplets H,W, the diameter and height of the vessel sections 14,16 being designed to minimize impingement on the walls of the vessel 12 and provide the desired fall residence time.

The plurality of nozzles 22, directed upwardly or downwardly within the vessel 12, direct the droplets H,W conically, yet generally axially within the vessel 12. The nozzles 22 can be either simple orifices, or steam atomizer nozzles, wherein steam is co-injected with the feedstream F from the nozzle 22 to the vessel 12. Steam input at the nozzles 22 acts to induce the feedstream F to enter the vessel 12 at greater velocity and further acts to transfer heat to the hydrocarbon droplets H substantially immediately following flashing of solvent S therefrom. In this manner, the hydrocarbon droplets H are not permitted to cool significantly following flashing for substantially continuous vapourization of solvent S therefrom. In embodiments of the invention, removeable nozzles 22 are used for ease of maintenance.

Having reference again to FIGS. 1A and 1B, the TSRU vessel 12 comprises the upper section 14 and the lower section 16 and can have a conical connecting section 32 connecting therebetween. The upper section 14 has a larger cross-sectional area than the lower section 16. The upper section 14 is of sufficient dimensions to permit spraying of the feedstream F through the plurality of feed nozzles 22 with minimal impingement of the hydrocarbon droplets H formed therefrom on the walls of the vessel 12. The cross-sectional area of the upper section 14 is also sufficient such that an upward vapour flux, created by the countercurrent fluid flow, such as by rising vapour and steam within the vessel 12, is not so great as to entrain fine solids, such as clay particles and most of the water droplets. Thus, plugging and contamination of the demister pad or pads 18 at the top 20 of the vessel 12 is minimized.

In embodiments of the invention, a reduced cross-sectional area of the lower section 16 acts to locally increase the velocity of countercurrent fluid flow rising therein. The velocity of the rising vapour and steam are greater than a minimum velocity required so as to generally fluidize the hydrocarbon droplets H for increasing the fall residence time of the droplets through a fluidization zone 27. The increased fall residence time permits enhanced contact between the falling hydrocarbon droplets H and steam rising from below the steam distributor 26 for re-heating the hydrocarbon droplets H so as to vapourize residual solvent S therefrom.

The falling hydrocarbon droplets H are sufficiently small, at about 0.1 mm to about 0.2 mm, such that they are readily fluidized by the countercurrent fluid flow for achieving the desired fall residence time in the vessel 12.

In embodiments of the invention, some additional heat transfer may also occur as the hydrocarbon droplets H fall onto walls of the conical connecting section 32. The conical connecting section 32 of the vessel 12 may be heated by the steam or by other means, such as heat coils in communication with the walls of the vessel 12. Further, heat transfer may also occur between the hydrocarbon droplets H and portions of the steam distributor 26 as some of the hydrocarbon droplets H incidentally fall thereon.

Having reference to FIGS. 4-7, the steam distributor 26 comprises layers 40 of pipes 42, each layer 40 comprising a plurality of spaced apart pipes 42. Each layer 40 of pipes 42 is oriented at an angle relative to the other layers 40 for forming a grid of pipes 42 therein. In embodiments of the invention, two layers 40,40 of pipes 42 are oriented 90 degrees to one another for forming the steam distributor 26.

Figure 6:
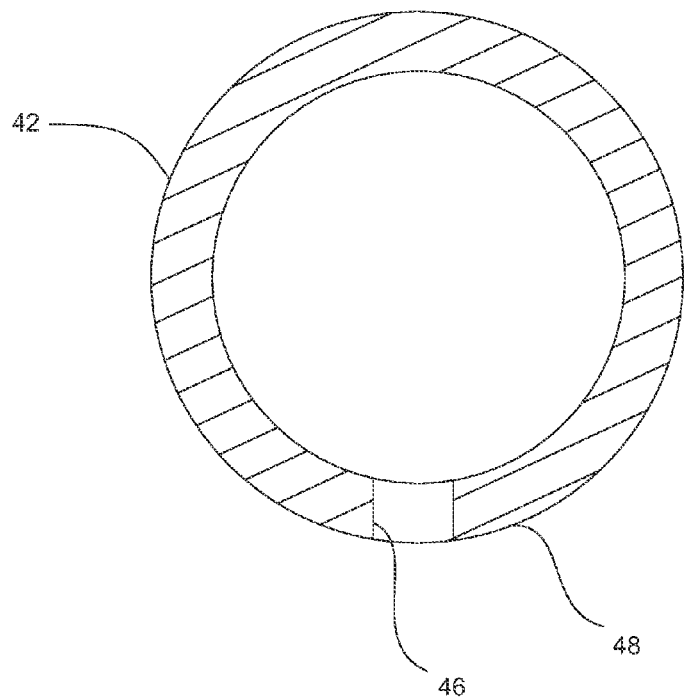
FIG. 6 is a cross-sectional view of a steam pipe in the steam distributor of FIG. 4 illustrating a steam outlet at a bottom of the steam pipe.
Figure 7:
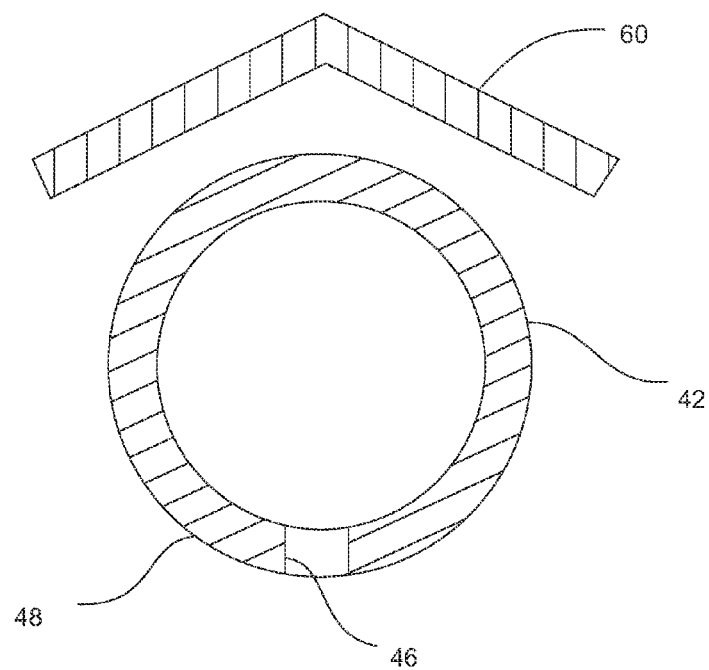
FIG. 7 is a cross-sectional view of a steam pipe having a protective cap formed thereover.

As shown in FIGS. 6 and 7, steam can be delivered downwardly from the steam distributor 26. Each pipe 42 of a lower layer 40L of pipes 42 has a plurality of steam orifices 46 formed along an underside 48 of the pipes 42 for initially directing the steam downwardly therefrom. The steam thereafter rises upwardly through restricted openings 50 between the plurality of pipes 42 in the grid, which acts to temporarily increase the velocity of the steam passing the steam distributor 26. In embodiments having a narrowed lower cross-sectional section 16, the increased steam velocity aids in fluidizing the hydrocarbon droplets H in the fluidization zone 27.

Optionally, steam inlet nozzles (not shown) are positioned below the grid of pipes 42 in the steam distributor 26.

In embodiments of the invention, the feedstream F is pressurized, as is known in the art, prior to introduction to the TSRU vessel 12 so as to achieve a pressure drop upon entry into the vessel 12. In embodiments of the invention the pressure drop is between about 550 kPa to about 825 kPa.

Embodiments of the invention contemplate use of two or more substantially identical TSRU vessels 12 operated in series. As is known in the art, a second or subsequent vessel 12 is typically operated at a lower pressure than a first or preceding TSRU vessel 12 for removing residual solvent S from the underflow stream L of the previous TSRU vessel 12.

EXAMPLES

Physical Modelling

Having reference to FIGS. 8A-11, physical modelling of the solvent vapourization process according to embodiments of the invention was conducted to predict the time required to achieve substantial solvent recovery from the hydrocarbon droplets H. The model took into consideration the physical properties, operating conditions and governing equations of fluid mechanics and heat transfer between a single hydrocarbon droplet H and the surrounding gas-phase environment as is known by those of skill in the art.

In the model, pressurized liquid feed at 85° C. and 690 kPaa, with an initial composition defined by a solvent to bitumen mass ratio (S/B) of 20 was passed through upwardly directed nozzles 22 to enter the TSRU vessel 12 at time zero to produce hydrocarbon droplets H having an initial diameter of 0.5 mm and an initial upward velocity of 15 m/s. The hydrocarbon droplets were directed upwardly to first rise and then fall under the influence of gravity. The hydrocarbon droplets encounter a gas-phase environment characterized by a temperature of 85° C., which simulated heat provided to the vessel atmosphere by the heated feedstream F, and a pressure of 140 kPaa which contributed to vapourization of solvent S from the hydrocarbon droplet H to the gas phase. The overall rate of vapourization was found to be enhanced by the high liquid/gas interfacial area which resulted from the relatively small initial diameter of the hydrocarbon droplets H. The addition of a countercurrent flow of an inert fluid or steam to the vessel 12 was not included in the model.

Figure 8A:
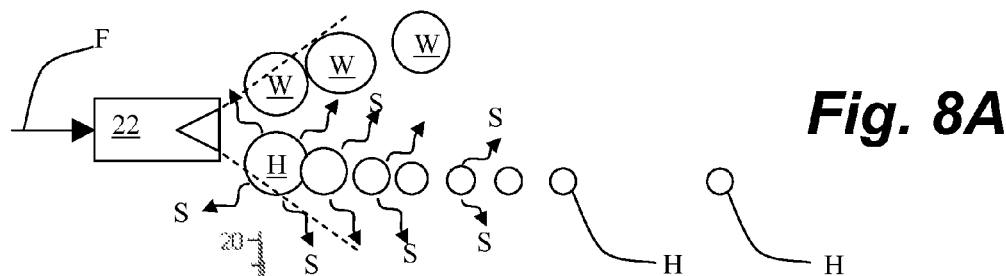
FIG. 8A is a schematic of the nozzle and change in size of hydrocarbon droplets and water droplets over time.
Figure 8B:
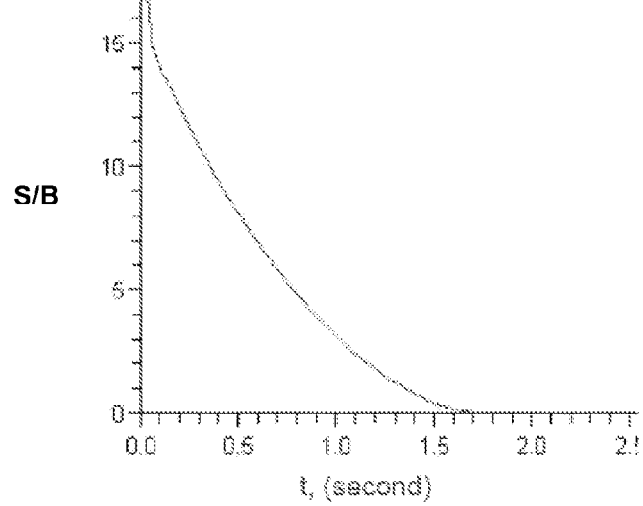
FIG. 8B is a graphical representation of physical modeling data to illustrate the change in solvent/bitumen (S/B) composition of a hydrocarbon droplet according to FIG. 8A, over time in a vessel according to an embodiment of the invention.

As shown in FIGS. 8A and 8B, solvent is first flashed and then vapourized from the hydrocarbon droplets, reducing the diameter of the hydrocarbon droplets over time until substantially only bitumen and other solids remains.

As shown in FIG. 8B, the S/B ratio decreased from the initial S/B ratio of 20 to substantially zero after 1.7 seconds due to vapourization of solvent S to the gas phase.

Figure 9:
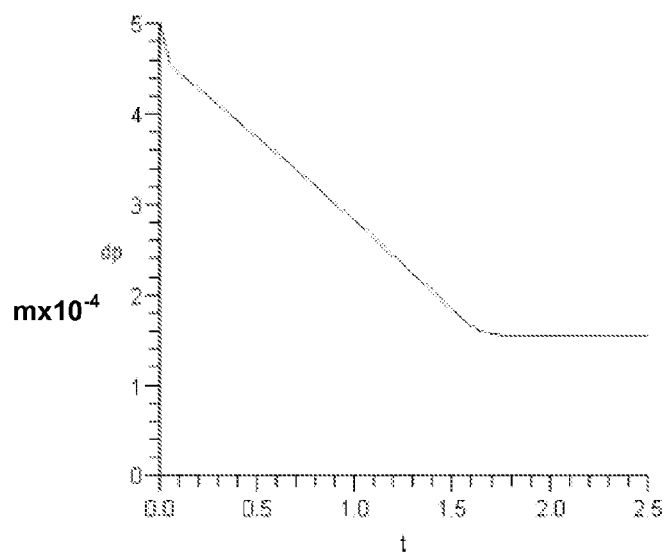
FIG. 9 is a graphical representation of physical modeling data illustrating a change in hydrocarbon droplet diameter over time as a result of vapourization in a vessel according to an embodiment of the invention.

Having reference to FIGS. 8A and 9, as the solvent is vapourized from the hydrocarbon droplets, a diameter of the hydrocarbon droplets decreased from the initial 0.5 mm size to stabilize at about 0.15 mm when the hydrocarbon droplets H were substantially solvent-depleted.

Figure 10:
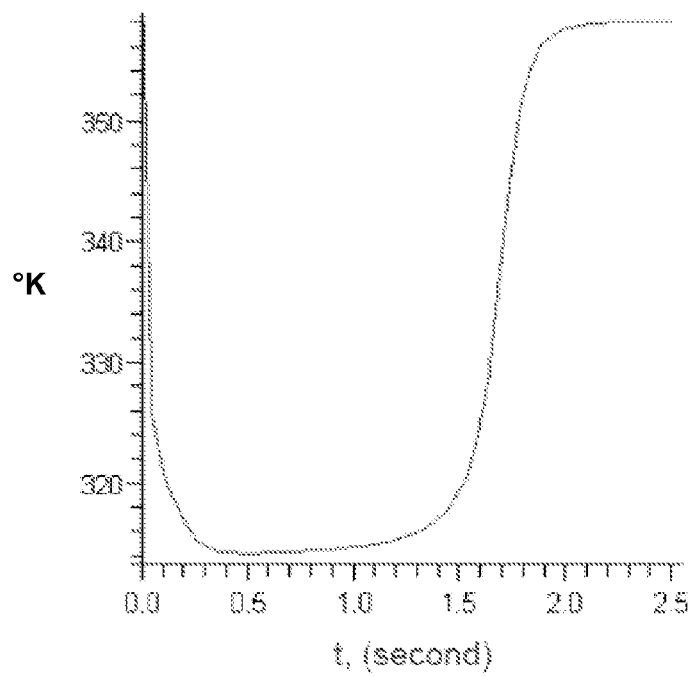
FIG. 10 is a graphical representation of physical modeling data illustrating changes in hydrocarbon droplet temperature over time in a vessel according to an embodiment of the invention.

As shown in FIG. 10, the temperature of the hydrocarbon droplets H initially decreased sharply due to latent heat of vapourization of the solvent S following flashing. The temperature stabilized as solvent S continued to vapourize and thereafter began to increase as a result of convective heat transfer to the hydrocarbon droplets H from the surrounding gas-phase medium. The heat transfer would be enhanced if a heated inert fluid such as steam were added.

Figure 11:
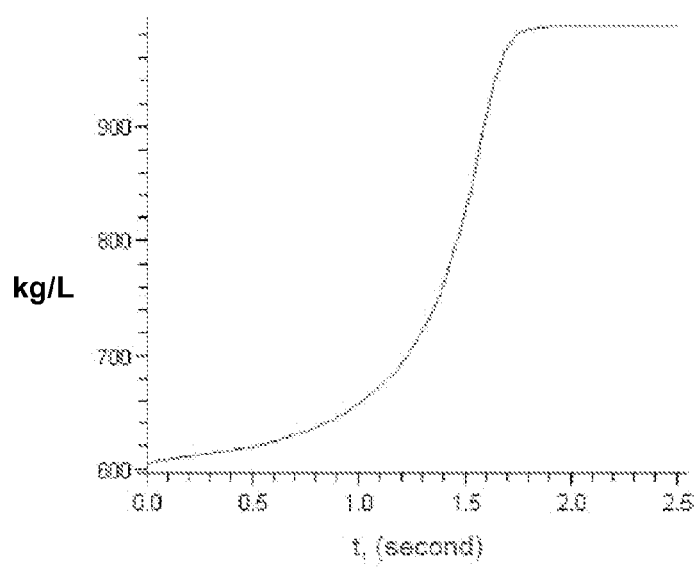
FIG. 11 is a graphical representation of physical modeling data illustrating changes in hydrocarbon droplet density over time in a vessel according to an embodiment of the invention.

Having reference to FIG. 11, the density (kg/L) of the hydrocarbon droplets H increased over time as a result of vapourizing light solvent S therefrom. The resulting solvent-depleted hydrocarbon droplets contained an increasing fraction of higher density, non-volatile bitumen.

Thus, it is clear from the physical modelling data of FIGS. 8A-11, the hydrocarbon droplets H are substantially solvent-depleted in a fall residence time of about 2 seconds under the stated conditions. Again, use of countercurrent fluid flow and steam in particular, is expected to result in a more rapid decrease in diameter.

Example A

With reference to FIG. 1A, an embodiment of the invention was designed for a commercial plant which would generate 100,000 barrels of bitumen per day. Two substantially identical TSRU vessels 12 in series were used in a two-stage process. A first TSRU vessel 12 was operated at a pressure above atmospheric, at about 130 kPaa, and a second TSRU vessel 12 was operated at sub-atmospheric pressure, under vacuum conditions at about 78 kPaa.

The total height of each TSRU vessel 12 was 17 m (56 feet). The upper section 14 was 10 m (33 feet) in height and 12 m (39 feet) in diameter, comprising, in descending order from the top of the vessel, a 1 m (3.3 feet) demister section 18, a 1 m (3.3 feet) vapour section, a 3 m (9.8 feet) spray section and a 2.5 m (8.2 feet) nozzle section.

The lower section 16 was 7 m (23 feet) in height and 5 m (16 feet) in diameter comprising a 3 m (9.8 feet) tubular section and a 4 m (13 feet) conical bottom section. The steam distributor 26 was positioned in the tubular section and the fluidization zone 27 was formed in the tubular section thereabove.

The solvent-containing tailings feedstream F fed to the first TSRU vessel 12 contains a maximum paraffinic solvent content of about 12% by weight. The feedstream F was provided to the vessel 12 at a feed rate of 1000 tons per hour. The feedstream F comprised water, mineral solids and bitumen, which includes asphaltenes and maltenes. The feedstream F was preheated to a temperature of about 98° C. The temperature of the first TSRU vessel 12 was between 70° C. and 95° C.

Figure 2:
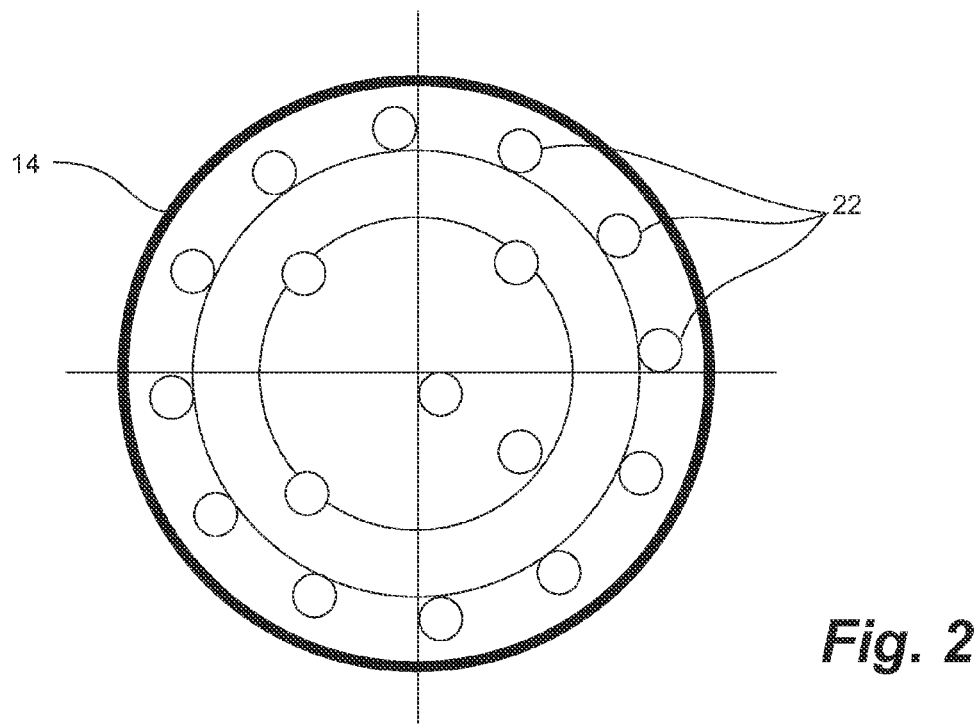
FIG. 2 is a cross-sectional view of the TSRU of FIG. 1A, illustrating a plan view of a nozzle arrangement positioned within an upper section of the TSRU.
Figure 3:
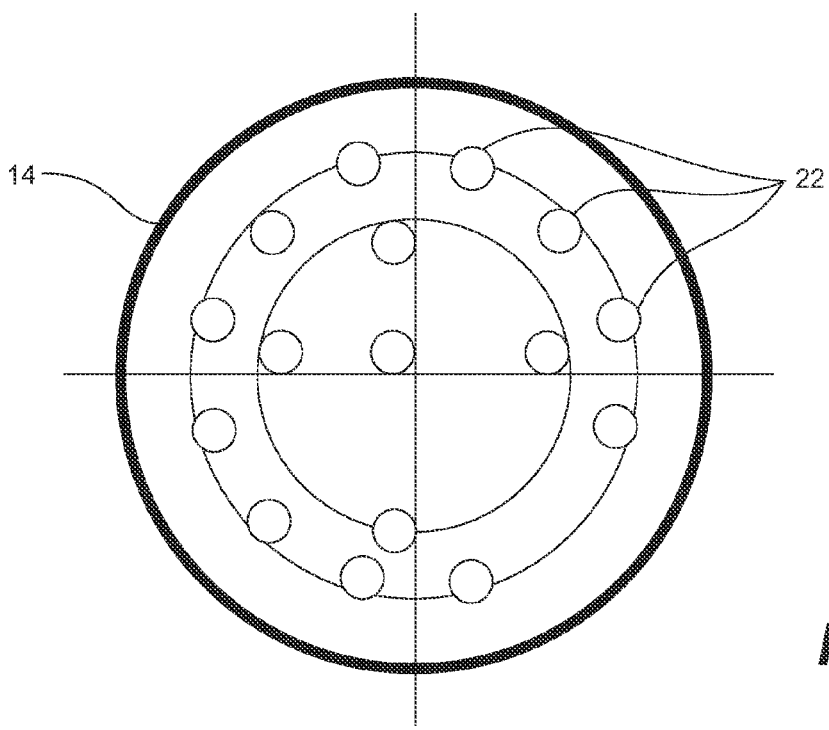
FIG. 3 a cross-sectional view of the TSRU of FIG. 1A, illustrating a plan view of a backup nozzle arrangement within the upper section of the TSRU.

Nozzle Section:

As shown in FIGS. 1A, 2 and 3, the plurality of feed nozzles 22 positioned in the upper section 14 of the vessel 12 were oriented towards the top 20 of the vessel 12 to spray the feedstream F upwards to within approximately one quarter of the length of the vessel 12 from the top 20. The hydrocarbon droplets H formed by the nozzles 22 initially moved upwardly in the vessel 12 and then fell downwardly under the force of gravity, passing the original nozzle entry point at about two seconds after discharge from the nozzles 22. Solvent S was flashed from the hydrocarbon droplets H as a result of the pressure drop within the vessel 12. The initial solvent loss as a result of flashing acted to reduce the diameter of the droplets and aided in increasing the fall residence time. The diameter of the hydrocarbon droplets H was further reduced as residual solvent S was vapourized over time and as the hydrocarbon droplets H were reheated within the vessel 12. Vapourization of solvent S reduced the diameter of the original hydrocarbon droplet H from about 0.5 mm to about 0.1 to 0.2 mm. The significant decrease in the size of the hydrocarbon droplets H acted to reduce the rate at which the hydrocarbon droplets H fell, increasing the fall residence time of the droplets in the TSRU vessel 12. Further, the large surface area of the hydrocarbon droplets H permitted greater solvent S vaporization therefrom.

A pressure control valve (not shown) was provided upstream from the plurality of nozzles 22 so as to maintain the solvent S in the feedstream F in the liquid phase prior to introduction to the TSRU vessel 12. A pressure drop between the vessel 12 and the feedstream F of between 550 and 825 kPa was provided. In this embodiment of the invention, a pressure drop of 690 kPa was used.

The number of nozzles 22 provided depended upon the flow rate of the feedstream F. In this example, as shown in FIGS. 2 and 3, for an individual nozzle flow rate of about 60 m³/h and a total TSRU feed flow rate of about 1020 m³/h, seventeen (17) nozzles 22 were positioned in the nozzle section within the diameter of the upper section 14 of the TSRU vessel 12. In order to ensure functionality of the TSRU vessel, an additional seventeen (17) standby or backup nozzles 22 were also installed in the nozzle section and could be used should it be required.

Nozzle orifices of 1.5 mm were provided which were selected to pass solids of an expected size while providing the desired droplet size. A froth strainer was used to remove large particulate solids from the feedstream F prior to the nozzles 22.

Figure 4:
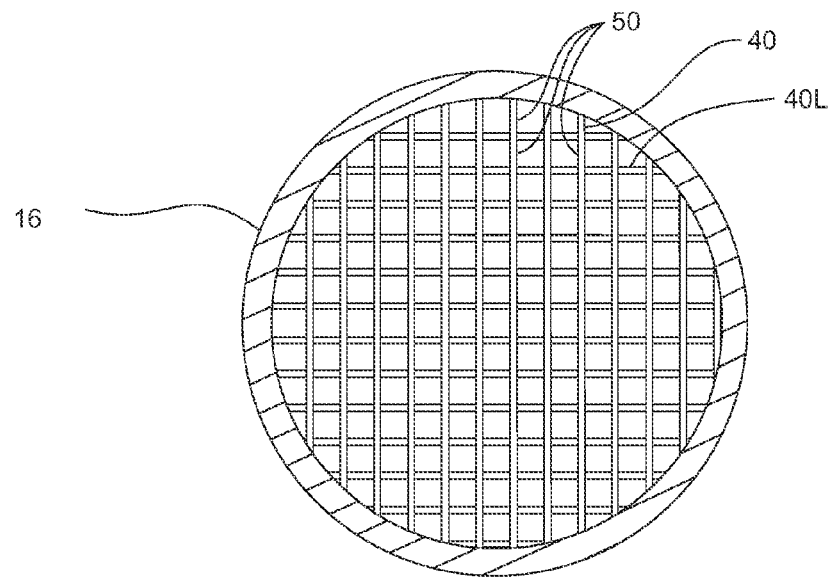
FIG. 4 is a cross-sectional view of the TSRU of FIG. 1A, illustrating a a plan view of a steam distributor positioned in a lower section of the TSRU.
Figure 5:
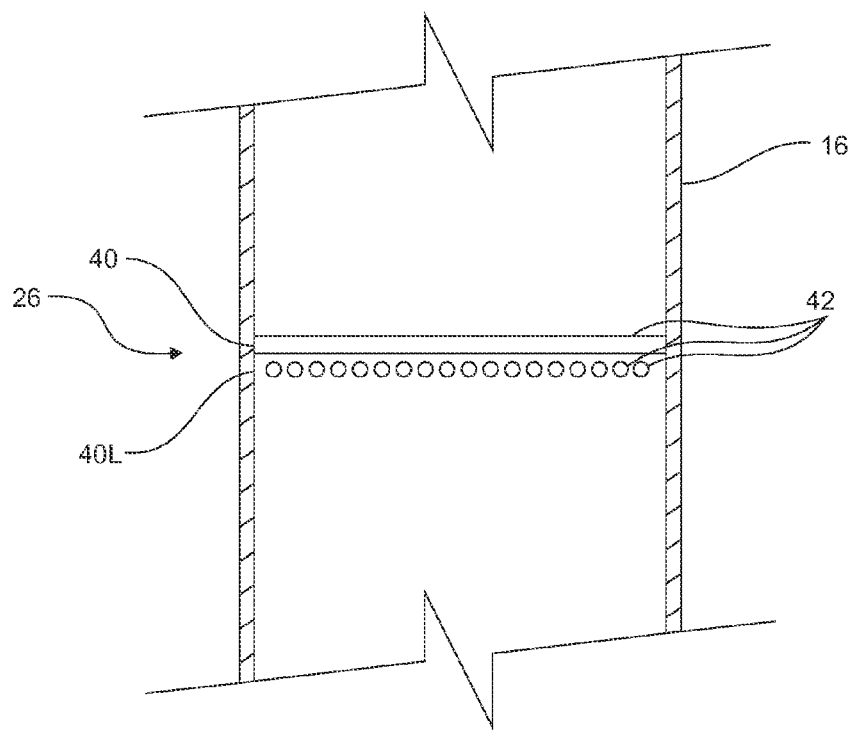
FIG. 5 is a partial sectional side view of the TSRU of FIG. 1A, showing the steam distributor of FIG. 4.

Steam Distributor Section:

As shown in FIGS. 4-6, the steam distributor 26 was formed by two layers 40 of pipes 42 installed at an angle too each other, such as at 90 degrees. The steam distributor 26 was positioned within the lower section 16 of the vessel 12 to supply heat to the downflowing hydrocarbon droplets H and to fluidize the hydrocarbon droplets H in the fluidization zone 27 above the steam distributor 26. In embodiments of the invention, the ratio of steam flow rate to TSRU feed rate was less than about 0.03 on a mass basis.

Optionally, as shown in FIG. 7, protective shields 60, such as angle-iron members, were installed above each steam pipe 42 in the steam distributor 26 for minimizing the erosive effects of falling, abrasive droplets.

Pump Box Section:

The solvent-depleted hydrocarbon droplets H eventually coalesced or were overtaken by water droplets within the vessel 12 and therefore were caused to accumulate as a liquid pool containing solids at the bottom 13 of the vessel 12, in the conical section 29. The collected substantially solvent-depleted underflow stream L was thereafter discharged from the vessel 12 by pumping to a tailings pond for disposal. The underflow L was substantially solvent-depleted and therefore there was little, if any, solvent release therefrom. Thus, the underflow L from embodiments of the invention met EUB standards and could be safely disposed of, such as by beaching, without fear of ignition.

If foaming is experienced, the underflow stream L could be pumped out rapidly and easily from the bottom 13 of the vessel 12 without altering the recovery of solvent S as substantially all the solvent vapour had been released before the hydrocarbon droplets H accumulate in the bottom 13. This feature is particularly advantageous over prior art designs as foaming has been reported to be a problem. Generally, the addition of chemicals, including defoamers and asphaltene dispersants, has not been contemplated. However, the addition of such chemicals is not specifically precluded and may be used should particular circumstances warrant their use.

The average pool retention time of the liquids in the pump box 24 was about 90 seconds. The diameter of the lower section 16 of the vessel 12 was further sized so as to maintain a high downward velocity of the tailings underflow L to prevent segregation of mineral solids and asphaltenes, for avoiding the formation and retention of an asphaltene "mat" in the vessel 12 that may accumulate over time.

Example B

As shown in Table A, pilot testing using a TSRU vessel 12 according to an embodiment of the invention was performed using a pentane ($C_5$)-containing solvent tailings feedstream originating from a froth treatment process. Additional testing was also performed using a mixture of pentane and hexane ($C_5/C_6$) as solvent. A single vessel 12 was tested in a one-stage operation and two substantially identical vessels 12 were tested in a two-stage operation. A conventional nozzle of the WHIRLJET® type and a steam co-injection nozzle were tested, as were different operating temperatures. The vessel had a 12-inch diameter column. A feed flow rate of 10 L/min was used. For both the one stage and the two stage testing, the vessel 12 was operated at 130 kPaa.

TABLE A

| Test # | Solvent Type | Number of Stages | Nozzle Type | TSRU Feed Temp (° C.) | Solvent content in TSRU underflow (wt %) | Solvent Recovery % | Solvent loss, bbl solvent per 1000 bbl bitumen produced |
|---|---|---|---|---|---|---|---|
| 1 | $C_5$ | One-stage | Conventional | 70 | 0.64 | 92 | 8.7 |
| 2 | $C_5$ | One-stage | Conventional | 81 | 0.04 | 95 | 0.5 |
| 3 | $C_5$ | One-stage | Conventional | 82 | 0.21 | 97 | 2.9 |
| 4 | $C_5$ | One-stage | Conventional | 73 | 0.33 | 95 | 4.5 |
| 5 | $C_5$ | One-stage | Conventional | 75 | 0.09 | 92 | 1.3 |
| 6 | $C_5$ | One-stage | Conventional | 98 | 0.25 | 95 | 3.4 |
| 7 | $C_5$ | One-stage | Conventional | 73 | 0.29 | 96 | 4.0 |
| 8 | $C_5$ | One-stage | Conventional | 83 | 0.47 | 94 | 6.4 |
| 9 | $C_5$ | One-stage | Conventional | 81 | 0.15 | 97 | 2.1 |
| 10 | $C_5$ | One-stage | Conventional | 75 | 0.31 | 94 | 4.2 |
| 11 | $C_5$ | One-stage | Conventional | 88 | 0.26 | 95 | 3.6 |
| 12 | $C_5$ | One-stage | Conventional | 76 | 0.54 | 91 | 7.4 |
| 13 | $C_5$ | One-stage | Conventional | 63 | 0.51 | 94 | 7.0 |
| 14 | C5 | One-stage | Conventional | 77 | 0.22 | 93 | 3.0 |
| 15 | C5/C6 | One-stage | Conventional | 67 | 0.76 | 82 | 10.3 |
| 16 | C5/C6 | One-stage | Conventional | 89 | 0.19 | 91 | 2.6 |
| 17 | C5/C6 | One-stage | Conventional | 50 | 0.08 | 84 | 1.1 |
| 18 | C5/C6 | One-stage | Conventional | 101 | 0.38 | 90 | 5.2 |
| 19 | C5/C6 | One-stage | Steam Co-injection | 80 | 0.17 | 91 | 2.4 |
| 20 | $C_5/C_6$ | One-stage | Steam Co-injection | 64 | 0.12 | 70 | 1.6 |
| 21 | $C_5/C_6$ | One-stage | Steam Co-injection | 94 | 0.49 | 93 | 6.6 |
| 22 | $C_5/C_6$ | One-stage | Steam Co-injection | 108 | 0.09 | 97 | 1.2 |
| 23 | $C_5/C_6$ | One-stage | Steam Co-injection | 107 | 0.40 | 87 | 5.4 |
| 24a | $C_5/C_6$ | First stage | Steam Co-injection | 97 | 0.15 | 96 | 2.1 |

TABLE A-continued

| Test # | Solvent Type | Number of Stages | Nozzle Type | TSRU Feed Temp (° C.) | Solvent content in TSRU underflow (wt %) | Solvent Recovery % | Solvent loss, bbl solvent per 1000 bbl bitumen produced |
|---|---|---|---|---|---|---|---|
| 24b | $C_5/C_6$ | Second stage | Steam Co-injection | 59 | 0.05 | 64 | 0.7 |
| 25a | $C_5/C_6$ | First stage | Conventional | 85 | 0.42 | 88 | 5.7 |
| 25b | $C_5/C_6$ | Second stage | Steam Co-injection | 60 | 0.20 | 53 | 2.7 |

Note 1:
Solvent recovery calculated based on measured solvent contents in TSRU underflow and TSRU feed shown for the considered stage (not overall solvent recovery in case of 2-stage tests)

Note 2:
Solvent loss is calculated based on bitumen recovery and bitumen and solvent contents in TSRU underflow.

As one of skill in the art would appreciate from the results shown in Table A, considerable variability was observed in the data for solvent content in the underflow and solvent losses among repeat runs at the same conditions. The variability is thought to be attributable to measurement variation, the small scale, limited test duration and variations in the feed temperature. Due to the substantial background variation, no significant differences were apparent in the results for the two solvent types or for the two nozzle types.

However, in generally all of the one-stage tests, low solvent contents in the TSRU underflow (average 0.30 wt %) with corresponding high recoveries of solvent in the feed (average 92%) and acceptable solvent losses (average 4.1 bbl solvent per 1000 bbl bitumen) were achieved.

The embodiments of the invention in which an exclusive property or privilege is claimed are defined as follows:

1. A solvent recovery vessel for recovery of solvent from a tailings feedstream containing at least bitumen, solvent and water comprising:
a vessel being substantially free of internals, having a heated atmosphere and receiving a pressurized tailings feedstream therein, the vessel having an upper outlet for removing at least a vapour stream of solvent therethrough and a lower outlet at a bottom of the vessel for removing a substantially solvent-depleted underflow stream therethrough;
a plurality of nozzles positioned in an upper section of the vessel for imparting shear to the tailings feedstream introduced into the vessel at a pressure drop of about 550 kPa to about 825 kPa for vaporizing solvent from the tailings feedstream, the nozzles forming at least hydrocarbon droplets containing at least bitumen and solvent, discrete from water droplets, the nozzles directing the tailings feedstream generally vertically therein, the plurality of nozzles being directed upwardly within the vessel; and
a height of the vessel, wherein at least a portion of the hydrocarbon droplets introduced by the plurality of nozzles fall through the height of the vessel to the bottom in a fall residence time less than about 10 seconds, further vaporizing solvent from the hydrocarbon droplets and reducing a diameter of the solvent-depleted hydrocarbon droplets to within a range from about 0.2 mm to about 0.1 mm for forming a substantially solvent-depleted underflow stream.

2. The vessel of claim 1 further comprising:
a liquid level control for retaining the substantially solvent-depleted underflow stream in a lower section of the vessel only so long as to discharge the underflow stream therefrom.

3. The vessel of claim 1 further comprising a distributor positioned above the collected substantially solvent-depleted underflow stream for introducing an inert fluid for flowing countercurrent to the hydrocarbon droplets falling in the vessel for reheating the hydrocarbon droplets.

4. The solvent recovery vessel of claim 3 wherein the inert fluid is steam.

5. The solvent recovery vessel of claim 4 wherein the distributor further comprises:
a plurality of steam orifices.

6. The solvent recovery vessel of claim 5, wherein the lower vessel section has a reduced cross-sectional area relative to a cross-sectional area of the upper section of the vessel, the lower vessel section further comprising
a fluidization zone, the plurality of steam orifices being positioned in the fluidization zone; and
a conical bottom having the liquid level control for collecting the substantially solvent-depleted underflow stream,
wherein the reduced cross-sectional area increases a velocity of the steam to be about a fluid velocity for fluidizing the hydrocarbon droplets in the fluidization zone thereabove, the fluidizing increasing the fall residence time of the hydrocarbon droplets through the height of the vessel so as to enhance vapourizing of the residual solvent therefrom while maintaining a total residence time in the vessel at less than about 2 minutes.

7. The solvent recovery vessel of claim 2 wherein a total height of the upper section of the vessel and the lower section of the vessel is sufficient to ensure substantially all the solvent is vapourized from the hydrocarbon droplets before the hydrocarbon droplets reach the bottom of the vessel.

8. The solvent recovery vessel of claim 1 wherein the vessel is at about atmospheric pressure and the vessel further comprises:
a pressure control valve upstream of the plurality of nozzles for pressurizing the solvent-containing tailings feedstream for achieving the pressure drop of between about 550 kPa and about 825 kPa.

9. The solvent recovery vessel of claim 1 wherein the plurality of nozzles further co-inject steam for reheating the hydrocarbon droplets formed therefrom substantially immediately following exiting the plurality of nozzles.

10. The solvent recovery vessel of claim 5 wherein the plurality of steam orifices are formed in the steam distributor further comprising:

two or more layers of spaced apart pipes, each of the two or more layers being oriented at an angle relative to other of the two or more layers for forming a grid of pipes, wherein each of the spaced apart pipes of a lower layer of pipes comprises the plurality of steam orifices formed in an underside of the pipes for directing the steam downwardly therefrom.

11. A solvent recovery vessel for recovery of solvent from a tailings feedstream containing at least bitumen, solvent and water comprising:
  a vessel being substantially free of internals, having a heated atmosphere and receiving a pressurized tailings feedstream, the vessel having an upper outlet for removing at least a vapour stream of solvent therethrough, and a lower outlet at a bottom of the vessel for removing a substantially solvent-depleted underflow stream therethrough,
  a plurality of nozzles positioned in an upper section of the vessel for imparting shear to the tailings feedstream introduced into the vessel at a pressure drop of about 550 kPa to about 825 kPa for vaporizing solvent from the tailings feedstream, the nozzles forming at least hydrocarbon droplets containing at least bitumen and solvent, discrete from water droplets, the nozzles directing the tailings feedstream generally vertically therein;
  a height of the vessel, wherein at least a portion of the hydrocarbon droplets introduced by the plurality of nozzles fall through the height of the vessel to the bottom in a fall residence time less than about 10 seconds, further vaporizing solvent from the hydrocarbon droplets and reducing a diameter of the solvent-depleted hydrocarbon droplets to within a range from about 0.2 mm to about 0.1 mm for forming a substantially solvent-depleted underflow stream; and
  a distributor positioned in a lower section of the vessel above the substantially solvent-depleted underflow stream, the distributor having two or more layers of spaced apart pipes, each of the two or more layers being oriented at an angle relative to other of the two or more layers for forming a grid of pipes, wherein
  each of the spaced apart pipes of a lower layer of pipes comprises a plurality of steam orifices formed in an underside of the pipes for directing steam downwardly therefrom for flowing countercurrent to the hydrocarbon droplets falling through the vessel.

12. The vessel of claim 11 further comprising:
  a liquid level control for retaining the substantially solvent-depleted underflow stream in the lower section of the vessel only so long as to discharge the underflow stream therefrom.

13. The solvent recovery vessel of claim 11, wherein the lower vessel section has a reduced cross-sectional area relative to a cross-sectional area of the upper section of the vessel, the lower vessel section further comprising
  a fluidization zone, the plurality of steam orifices being positioned in the fluidization zone; and
  a conical bottom having the liquid level control for collecting the substantially solvent-depleted underflow stream,
  wherein the reduced cross-sectional area increases a velocity of the steam to be about a fluid velocity for fluidizing the hydrocarbon droplets in a fluidization zone thereabove, the fluidizing increasing the fall residence time of the hydrocarbon droplets through the height of the vessel so as to enhance vapourizing of the residual solvent therefrom while maintaining a total residence time in the vessel at less than about 2 minutes.

14. The solvent recovery vessel of claim 11 wherein a total height of the upper section of the vessel and the lower section of the vessel is sufficient to ensure substantially all the solvent is vapourized from the hydrocarbon droplets before the hydrocarbon droplets reach the bottom of the vessel.

15. The solvent recovery vessel of claim 11 wherein the vessel is at about atmospheric pressure and the vessel further comprises:
  a pressure control valve upstream of the plurality of nozzles for pressurizing the solvent-containing tailings feedstream for achieving the pressure drop of between about 550 kPa and about 825 kPa.

16. The solvent recovery vessel of claim 11 wherein the plurality of nozzles further co-inject steam for reheating the hydrocarbon droplets formed therefrom substantially immediately following exiting the plurality of nozzles.

17. A solvent recovery vessel for recovery of solvent from a tailings feedstream containing at least bitumen, solvent and water comprising:
  a vessel being substantially free of internals, having a heated atmosphere and receiving a pressurized tailings feedstream, the vessel having an upper outlet for removing at least a vapour stream of solvent therethrough, and a lower outlet at a bottom of the vessel for removing a substantially solvent-depleted underflow stream therethrough;
  a plurality of nozzles positioned in an upper section of the vessel for imparting shear to the tailings feedstream introduced into the vessel at a pressure drop of about 550 kPa to about 825 kPa for vaporizing solvent from the tailings feedstream, the nozzles forming at least hydrocarbon droplets containing at least bitumen and solvent, discrete from water droplets, the nozzles directing the tailings feedstream generally vertically therein;
  a height of the vessel, wherein at least a portion of the hydrocarbon droplets introduced by the plurality of nozzles fall through the height of the vessel to the bottom in a fall residence time less than about 10 seconds, further vaporizing solvent from the hydrocarbon droplets and reducing a diameter of the solvent-depleted hydrocarbon droplets to within a range from about 0.2 mm to about 0.1 mm for forming a substantially solvent-depleted underflow stream;
  a lower section for collecting the substantially solvent-depleted underflow stream, wherein the lower vessel section has a reduced cross-sectional area relative to a cross-sectional area of the upper section of the vessel, the lower vessel section further comprising:
    a fluidization zone, the plurality of steam orifices being positioned in the fluidization zone; and
    a conical bottom having the liquid level control for collecting the substantially solvent-depleted underflow stream,
  a distributor, having a plurality of steam orifices, positioned above the collected substantially solvent-depleted underflow stream for introducing an inert fluid for flowing countercurrent to the hydrocarbon droplets falling in the vessel for reheating the hydrocarbon droplets,
  wherein the lower sections reduced cross-sectional area increases a velocity of the steam to be about a fluid velocity for fluidizing the hydrocarbon droplets in the fluidization zone thereabove, the fluidizing increasing the fall residence time of the hydrocarbon droplets through the height of the vessel so as to enhance vapourizing of the residual solvent therefrom while maintaining a total residence time in the vessel at less than about 2 minutes; and a liquid level control for retaining the collected solvent-depleted underflow stream in the lower section only so long as to discharge the underflow stream therefrom.

18. The solvent recovery vessel of claim 17 wherein a total height of the upper section of the vessel and the lower section of the vessel is sufficient to ensure substantially all the solvent is vapourized from the hydrocarbon droplets before the hydrocarbon droplets reach the bottom of the vessel.

19. The solvent recovery vessel of claim 18 wherein the vessel is at about atmospheric pressure and the vessel further comprises:
a pressure control valve upstream of the plurality of nozzles for pressurizing the solvent-containing tailings feedstream for achieving the pressure drop of between about 550 kPa and about 825 kPa.

20. The solvent recovery vessel of claim 17 wherein the plurality of nozzles further co-inject steam for reheating the hydrocarbon droplets formed therefrom substantially immediately following exiting the plurality of nozzles.

* * * * *